April 23, 1957  S. R. PORWANCHER  2,790,042
CONTROL DEVICES
Filed Oct. 12, 1955
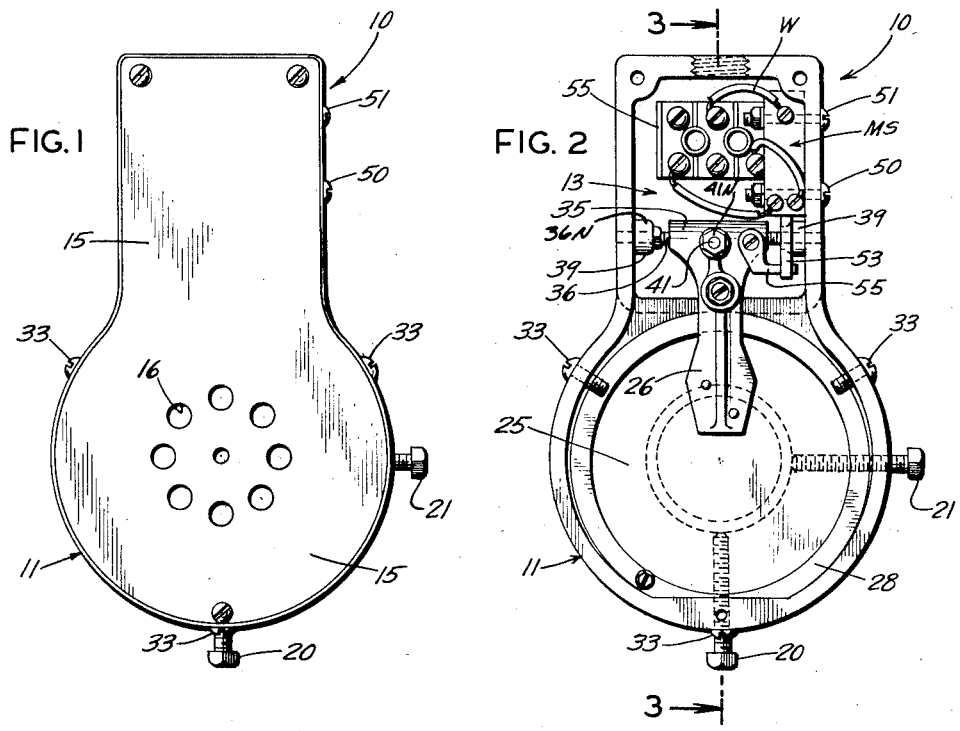
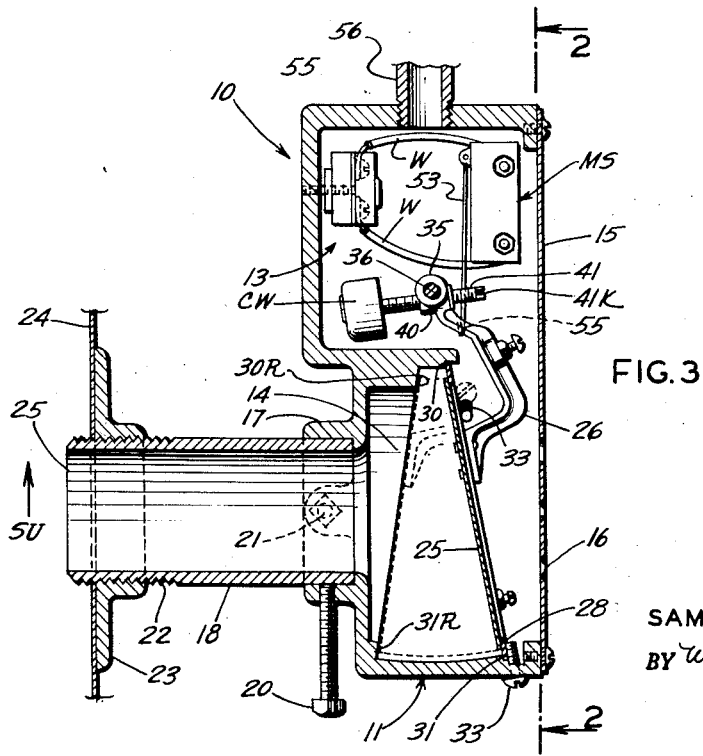
INVENTOR.
SAMUEL R. PORWANCHER
BY Wallace and Cannon
ATTORNEYS United States Patent Office 2,790,042
Patented Apr. 23, 1957

2,790,042
CONTROL DEVICES

Samuel R. Porwancher, Chicago, Ill., assignor to Drying Systems, Inc., Chicago, Ill., a corporation of Illinois Application October 12, 1955, Serial No. 539,974

2 Claims. (Cl. 200—81.9)

This invention relates to a pressure-responsive control device responsive to changes in pressure of a body of fluid, and in particular the invention relates to a control device embodying a safety switch adapted to disable or otherwise assure the protection of equipment likely to be damaged in the event that fluid pressure in the system where such equipment has been installed fails to be maintained at normal or operating pressure.

In operating equipment such as heaters, blowers, ovens, dryers, and the like under circumstances where air or other fluid is to be maintained at a predetermined rate of flow or pressure, a protective device is usually associated with such equipment so as to sense the area in which the fluid is confined and disable the operating equipment or establish a warning signal in the event that the body of the fluid is at a pressure above or below that which is necessary for safe operation. For instance, devices of the foregoing kind usually embody a switch, and are used extensively in control circuits to close fuel valves to gas or oil burners in the event of fan failure or to disable the burner in case of draft failure, and in such circumstances are arranged to sense the air pressure in the air duct, either on the suction or pressure side. In like manner, such a device can be used to operate warning signals upon a change in fluid pressure on either side of a predetermined operating value, and it will be readily recognized from the foregoing that the abnormal condition sensed may result either in the establishment or breaking of a control circuit.

In constructing such fluid responsive control devices, resort has been had to a mercury switch that is carried by a pivotally mounted sensing element, and hence accurate balancing is required if the switch is to be immediately responsive to the sensing of an undesired value of fluid pressure by the sensing element. In other words, difficulty has been entailed in arranging the mercury tube with respect to the pivotal support for the sensing element to assure an accurate relation between the responses of the sensing element and the concomitant tilt of the mercury tube to break or close the control circuit. Moreover, there are circumstances where there is danger of fracturing the mercury tube, and special precautions must be taken to overcome this; and in certain systems that are to be controlled in the aforesaid manner the presence of mercury is a detrimental factor, as for instance in the processing of photographic film.

The primary object of the present invention is to overcome these objectionable features in pressure responsive control devices that heretofore have embodied a mercury control switch.

Under the present invention, there is afforded a pressure responsive control comprising a micro-switch which does not need to be accurately balanced on a fulcrum, and neither carried nor tilted by the sensing element during responses of the sensing element to a change in fluid pressure. As a consequence of this, the sensing element which is adapted to shift or move in response to change in fluid pressure does not have to overcome the inertia or dead weight of the control switch, and accordingly such increases the sensitivity of the control in ability to respond instantly to a change in fluid pressure. The micro-switch can be anchored in place adjacent the sensing means with the highly sensitive contact arm of the switch disposed in position to be controlled by and upon movement of the sensing element. Therefore, it is not necessary that the switch move with the sensing element, as in the instance of a conventional mercury tube switch, and the likelihood of the switch acquiring an improper position on a fulcrum due to repeated tilting is altogether eliminated. The foregoing advantages constitute further attained objects of the present invention.

Other and further objects of the present invention will be apparent from the following description and claims and are illustrated in the accompanying drawing which, by way of illustration, shows a preferred embodiment of the present invention and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawings:

Fig. 1 is a front elevation of a control constructed in accordance with the present invention;

Fig. 2 is a front elevation of the control similar to Fig. 1 but with the cover plate removed, being taken substantially at the line 2—2 of Fig. 3; and Fig. 3 is a sectional view taken on the line 3—3 of Fig. 2.

The present invention is illustrated in the drawing as embodied in a pressure responsive control 10 comprising a casting affording a main housing 11, and this housing is divided into an upper compartment or chamber 13 and a lower chamber 14, Fig. 3.

The housing 11 includes a removable cover plate 15 provided with apertures 16, so that by removing the cover plate access may be had to the interior of the housing enabling adjustments and alterations in the control to be effected for purposes that will be clear from the description to follow.

The control 10 is adapted to be disposed in the vertical position shown in the drawing to sense the pressure of a fluid body such as a moving stream of air, and to this end the portion of the housing 11 affording the lower chamber 14 is formed with a forwardly extending mounting boss 17 which affords communication between the lower chamber 14 and a nipple 18 anchored in the boss 17 by set screws as 20 and 21. The end of the nipple 18 that is opposite the boss 17 is threaded at 22, and threadedly mounted on this portion of the nipple 18 is a flange 23 which is adapted to be secured directly to the wall of a duct or like conduit 24 with the end 25 of the nipple exposed to the fluid therein. It will be observed further in Fig. 3 that the end 25 projects beyond the flange 23. This is merely to show such relation is afforded when the nipple 18 is to be mounted on a directional elbow of a duct, such elbow having threads complementary to the threads on the nipple 18.

In Fig. 3, the arrow SU indicates installation of the control 10 on the suction side of an intake air duct of a fan or blower, so that suction is adapted to be established in the lower chamber 14. Such low pressure will likewise be established on the forward face of a fluid pressure sensing element in the form of a thin aluminum disc or vane 25 that is disposed in the lower chamber 14 of the housing 11. The disc or vane 25 includes an upwardly extending bracket 26, and this bracket 26 at the upper end thereof is pivoted in a way to be described.

Prior to establishing conditions creating a suction in chamber 14, the disc 25 is held, in a way to be described, against the rear face of a stop element in the form of an annular ring 28. The ring 28 is disposed at an angle in the chamber 14 of the housing 11, as will be observed in Fig. 3, and the upper and lower edges thereof engage upper and lower shoulders 30 and 31, respectively, formed in the casting 11. The ring 28 is held firmly in place against the shoulders 30 and 31 by the inner ends of short bolts 33 which engage the front face of the ring 28.

The upper end of the bracket 26 is provided with a head 35 which is countersunk at either side to receive complemental cone points on screws 36 serving as a pivot for the bracket 26. The screws 36 are threadedly mounted in bosses 39 and are provided with lock nuts 36N.

A threaded portion 40, Fig. 3, is formed at the upper end of the bracket 26 at the medial point thereof. An adjusting screw 41 serving as a lever arm is threadedly mounted in the portion 40 so as to extend in a general front to rear direction at right angles to the pivot described above, and at the end corresponding to the cover plate 15 the screw 41 is slotted at 41K so as to be adjustable in the portion 40 in the usual fashion upon removal of the cover plate 15. The position of the screw 41 is held by a lock nut 41N.

A counterweight CW is mounted on the end of the lever arm 41 opposite the kerf 41K, and the position of the counterweight is selected by adjustment of the screw 41 so as to engage the disc 25 with the stop ring 28 when no air is flowing in the duct on which the present control is used.

Anchored as by screws 50 and 51 in position above the pivot 36 in the upper chamber 13 is a micro-switch MS. The switch MS is of a conventional type and includes a highly sensitive contact arm in the form of a leaf spring 53 so tensioned that the lower end thereof engages a control arm 55 that is secured to the sleeve 35 of the bracket 26. Thus, the relation is such that the contact arm 53 is in the path of the arm 55 so that when the disc 25 is pulled or shifted clockwise from a normal to an actuated position as viewed in Fig. 3, the holding force of the arm 55 is removed from the leaf 53 which then springs clockwise, Fig. 3, to operate the switch MS. It will be appreciated that that such releasing of the leaf 53 upon a change in normal or operating pressure may be manifest either in a closing or opening of the switch MS, depending upon the control circuit in which the switch MS is associated and the type of equipment being controlled. It will also be recognized that other relations and positions between the control arm 55 and leaf spring 53 are possible to achieve specific actions.

So long as there is no air flow in the duct on which the control 10 is mounted, the control disc or vane 25 remains engaged with the ring 28. When air flow occurs, as by starting a fan operating in such duct, suction, that is negative pressure, is created in chamber 14 of the control, pulling the vane 25 clockwise to the dotted line position as viewed in Fig. 3 against a shoulder or stop means in the housing 11 that includes seats 30R and 31R that are spaced rearwardly of the shoulders 30 and 31. In so moving, the control arm 55 is relieved from the leaf 53 enabling the switch MS to operate. Should such suction, as at SU, Fig. 3, cease the control vane 25 will assume the normal position shown in solid lines in Fig. 3, disabling the switch MS.

One advantage of the control of the present invention is that the wires associated with the switch MS will not tend to be fatigued or become tangled, inasmuch as there is no movement of the switch MS with or upon movement of the sensing means 25. Thus, the circuit wires as W extend from the switch MS to a terminal block 55, and leads (not shown) to the terminal block 55 are afforded through a conduit 56 threadedly mounted as shown in Fig. 3 in the upper wall of the housing 11.

The switch MS may assume different forms so far as the contacts therein are concerned. Thus, the switch MS may be a single throw, double-pole switch so as to be capable of controlling two circuits, closing one while breaking the other. In devices of this kind which have heretofore used a mercury tube switch, such two circuit control has not been considered satisfactory because of the additional drag of the third wire, which is not of significance under the present invention.

To alter the control from a suction or negative pressure type to a positive pressure type, it is merely necessary to reverse the screw 41 in the part 40 of the bracket arm 26 to dispose the counterweight CW on the opposite side of the fulcrum 36. This disposes the vane 25 in a normal position with the upper and lower edges thereof in engagement with shoulders 30R and 31R, Fig. 3, that are spaced forwardly of the shoulders 30 and 31 in the lower chamber 14 of the housing 11.

Hence, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. In a dually settable reversible control device of the kind described responsive to a change from normal in the pressure of a fluid body to operate a control circuit, a housing, a pressure-responsive vane in a chamber in said housing, means enabling communication to be established between said chamber and a body of such fluid, said vane including a portion having a head, pivot means in said housing spaced from said chamber and on which the head of said vane is pivoted enabling the vane to pivot from a normal to an actuated position upon a change from normal in fluid pressure, said chamber including a first stop means confined therein to limit the vane in a first normal position of the vane, said chamber including other stop means confined therein in spaced relation to said first stop means and adapted to limit the vane in a second normal position of the vane, an adjustable lever arm carried by the head of said vane generally at right angles to the axis of said pivot means and extending beyond said pivot means, a counterweight on one end of said lever arm and located at one side of said head and adapted to bias the vane in its first normal position as aforesaid, said lever arm being reversible in said head to locate said counterweight on the other side of said head to thereby reverse the setting of the control device and bias the vane in the second of its normal positions as aforesaid, a control arm carried by the head of said vane, and a micro-switch for said circuit mounted in said housing with an operating leaf thereof biased to be engaged by said control arm upon movement thereof so as to actuate the switch when the vane pivots from a normal to an actuated position upon a predetermined change from normal in fluid pressure.

2. In a dually settable reversible control device of the kind described responsive to a change from normal in the pressure of a fluid body to operate a control circuit, a housing, a pressure-responsive vane in a chamber in said housing, means enabling communication to be established between said chamber and a body of such fluid, said vane including a portion terminating in a head having openings at opposite sides thereof, pivot means in said housing affording cone points received in the openings in said head enabling the vane to pivot from a normal to an actuated position upon a change from normal in fluid pressure, said chamber including a first stop means confined therein to limit the vane in a first normal position of the vane, said chamber including other stop means confined therein in spaced relation to said first stop means and adapted to limit the vane in a second normal position of the vane, an adjustable lever arm threadedly mounted in the head of said vane and extending generally normal to the axis of said pivot means beyond said pivot means, a counterweight on one end of said lever arm and located at one side of said head and adapted to bias the vane in its first normal position as aforesaid, said lever arm being reversible in said head to locate said counterweight on the other side of said head to thereby reverse the setting of the control device and bias the vane in the second of its normal positions as aforesaid, a control arm carried by the head of said vane, and a micro-switch for said circuit mounted in said housing with an operating leaf thereof biased to be engaged by said control arm upon movement thereof so as to actuate the switch when the vane pivots from a normal to an actuated position upon a predetermined change from normal in fluid pressure.

References Cited in the file of this patent

UNITED STATES PATENTS

| | | |
|---|---|---|
| 2,214,092 | Uhlhorn | Sept. 10, 1940 |
| 2,244,373 | Powers | June 3, 1941 |
| 2,259,973 | Firehammer | Oct. 21, 1941 |
| 2,348,950 | Anderson | May 16, 1944 |
| 2,499,040 | Steinback | Feb. 28, 1950 |
| 2,526,315 | Allen et al. | Oct. 17, 1950 |
| 2,577,104 | Butler | Dec. 4, 1951 |
| 2,583,814 | Burklin | Jan. 29, 1952 |
| 2,716,228 | Greene | Aug. 23, 1955 |
| 2,740,858 | Euler | Apr. 3, 1956 |